(12) United States Patent
Donnet et al.

(10) Patent No.: US 12,383,376 B2
(45) Date of Patent: Aug. 12, 2025

(54) POWDER CHAMBER FOR AN AIR-POLISHING DEVICE AND AIR-POLISHING DEVICE

(71) Applicant: FERTON HOLDING S.A., Delémont Schweiz (CH)

(72) Inventors: Marcel Donnet, Sait Jean De Gondville (FR); Karine Sauvageot-Maxit, Cuvat (FR)

(73) Assignee: FERTON HOLDING S.A., Delémont Schweiz (CH)

( * ) Notice: Subject to any disclaimer, the term of this patent is extended or adjusted under 35 U.S.C. 154(b) by 463 days.

(21) Appl. No.: 15/761,682

(22) PCT Filed: Jul. 4, 2016

(86) PCT No.: PCT/EP2016/065658
§ 371 (c)(1),
(2) Date: Mar. 20, 2018

(87) PCT Pub. No.: WO2017/050451
PCT Pub. Date: Mar. 30, 2017

(65) Prior Publication Data
US 2018/0360559 A1 Dec. 20, 2018

(30) Foreign Application Priority Data
Sep. 22, 2015 (EP) .................................... 15186315

(51) Int. Cl.
*A61C 3/02* (2006.01)
*A61C 3/025* (2006.01)
(Continued)

(52) U.S. Cl.
CPC ............ *A61C 3/025* (2013.01); *B24C 7/0046* (2013.01); *B24C 7/0053* (2013.01); *B24C 11/005* (2013.01); *B24C 7/0069* (2013.01)

(58) Field of Classification Search
CPC ..... A61C 3/025; B24C 7/0046; B24C 7/0053; B24C 7/0069; B24C 11/005
See application file for complete search history.

(56) References Cited

U.S. PATENT DOCUMENTS 3,798,841 A  3/1974  Eppler
4,482,322 A  11/1984 Hain et al.
(Continued)

FOREIGN PATENT DOCUMENTS

EP  0119021 A1  9/1984
EP  0643947 A1  3/1995
(Continued)

OTHER PUBLICATIONS

International Search Report for corresponding application PCT/EP2016/065658 dated Jul. 4, 2016; Mail date Sep. 22, 2016.
(Continued)

*Primary Examiner* — Matthew M Nelson
(74) *Attorney, Agent, or Firm* — CANTOR COLBURN LLP (57) ABSTRACT

Powder chamber for an air polishing device, extending from a top end to a bottom end along an axis, said powder chamber including at least two wall sections, where a first wall section forms a first angle with respect to the axis, and where a second wall section forms a second angle with respect to the axis, where the angles are measured in a measuring direction from the axis to the appropriate wall section in such a manner so that the acute angles are obtained, where the measuring direction from the top end to the bottom end is counted positive, and where the measuring direction from the bottom end to the top end is counted negative, where the second wall section is arranged below the first wall section, and where the second angle is smaller than the first angle.

10 Claims, 4 Drawing Sheets

(51) Int. Cl.
*B24C 7/00* (2006.01)
*B24C 11/00* (2006.01)

(56) References Cited

U.S. PATENT DOCUMENTS

| | | |
|---|---|---|
| 4,494,932 A | 1/1985 | Rzewinski |
| 6,074,135 A | 6/2000 | Tapphorn |
| 2006/0160046 A1 | 7/2006 | Nesbitt |
| 2008/0233540 A1 | 9/2008 | Olmo |
| 2014/0080090 A1* | 3/2014 | Laufer ............... A61C 17/0208 433/88 |

FOREIGN PATENT DOCUMENTS

| | | |
|---|---|---|
| EP | 2193758 A1 | 6/2010 |
| GB | 1394483 | 5/1975 |
| JP | 2013150871 A | 8/2013 |
| WO | 2012019576 A1 | 5/2011 |

OTHER PUBLICATIONS

Written Opinion for corresponding application PCT/EP2016/065658 dated Jul. 4, 2016; Mail date Sep. 22, 2016.
International Preliminary Report on Patentability for corresponding application PCT/EP2016/065658 filed Jul. 4, 2016; Report dated Apr. 5, 2018.

* cited by examiner

POWDER CHAMBER FOR AN AIR-POLISHING DEVICE AND AIR-POLISHING DEVICE

TECHNICAL FIELD

This invention relates to a powder chamber for an air-polishing device and to an air-polishing device.

BACKGROUND

Air-polishing devices, in particular air-polishing devices that comprise powder chambers, are used in the sand blasting technology, e.g. in the dental field. In this technology a powder is used for the dental prophylaxis, wherein the powder is a low abrasive powder, as for example sodium bicarbonate, calcium carbonate, glycine or erythritol. To avoid damaging of the teeth, the powder has a small grain size ranging from about 100 µm down to about 13 µm on average. There are mainly two ways to take out the powder from the powder chamber: one is by injecting air from the top of the powder chamber and the other is by injecting the air from the bottom of the powder chamber.

The second method delivers the most accurate powder flow rate and enables the best treatment. Nevertheless, the system presents different issues: the powder needs to flow up to a suction nozzle, but it is well known that the flow of small powders (<100 µm) is difficult to control. Additionally, the complete emptying of the powder chamber is not achieved all the time and the powder flow shows irregularities during emptying of the powder chamber.

EP 2 193 758 B1 uses a powder chamber that has two inclined planes. Such system may have a varying flow rate and a relatively high residue inside the powder chamber because the powder may get stuck in the chamber due to self-blockade. EP 0 119 021 B2 uses a simple cone with two inclinations. However, to make the system work properly, a powder has to be chosen which consists of relatively large particles, approximately 100 µm. Another solution to overcome the problem is to change completely the powder delivery process by using some vibrating system like described in GB 2 347 372 A. Such systems are complicated and have also problems using very fine powders.

BRIEF SUMMARY

Therefore, to the disclosure provides a powder chamber for an air-polishing device and an air-polishing device that enables a very constant flow rate, good flow control and which provides an improved emptying-behavior with no or a low residue of powder within the powder chamber.

According to the invention, a powder chamber for an air-polishing device extends from a top end to a bottom end along an axis, said powder chamber comprising at least two wall sections that extend along the axis, wherein the first wall section forms a first angle with respect to the axis, and wherein a second wall section forms a second angle with respect to the axis, wherein the angles are measured in a measuring direction from the axis to the appropriate wall section in such a manner so that the acute angles are obtained, wherein the measuring direction from the top end to the bottom end is counted positive, and wherein the measuring direction from the bottom end to the top end is counted negative, wherein the second wall section is arranged below/adjacent to the first wall section, and wherein the second angle is smaller than the first angle.

According to one embodiment, the powder chamber extends from the top end to the bottom end along the axis, said powder chamber comprising the at least two wall sections, wherein the second wall section is arranged below the first wall section, wherein the first wall section is tapered with respect to the axis, and wherein the second wall section comprises a maximum cross section area that is at least as big as a minimum cross section of the first wall section.

The powder chamber may for example be filled with low abrasive powder, such as sodium bicarbonate, calcium carbonate, glycine or an alditol like erythritol, which is steered up by pressurized air to form an air/powder-mixture. For this purpose, the powder chamber comprises for example an air inlet. According to one embodiment, the air/powder-mixture is transported via an outlet to an air polishing device that is adapted to process the air/powder-mixture, possibly added to a jet of water etc.

According to one embodiment, air and powder is mixed by a combination of carburetor technique and swirling. In this case, a venturi tube is arranged/located within the powder chamber. An opening/inlet of the venturi tube is located near to the inlet of the powder chamber. An (pressurized) air stream that is directed from the inlet of the powder chamber to the opening/inlet of the venturi tube carries or transports powder that is located between or around the aforementioned inlets. In other words, powder is sucked into the venturi tube. A grain size of the powder is preferably smaller than about 100 µm on average, for example within a range of about 5-50 µm, expediently about 10-40 µm.

Typically, the powder is ground and sieved to achieve a desired grain or particle size. The sieving process allows for example to choose particles that are smaller or bigger than a desired value (after graining). This means that "on average" does not inevitably mean a uniform distribution of the grain size. Instead, it is possible to sort out particles that are for example smaller than 5 µm or bigger than 70 µm or that are smaller than 10 µm and bigger than 40 µm. According to one embodiment, for example particles are sorted out (after graining) that are bigger than about 35 µm. This does not inevitably mean that most of the particles have a grain size of 35 µm.

As already mentioned, such fine powders do not fall well. Thus, emptying of powder chambers, as known from the prior art, is not good and the powder flow shows irregularities during emptying. This is because, due to the suction, the powder level falls down from the middle of the powder chamber until creating some air ways resulting in powder flow rate change. In order to minimize this effect, one solution is to create a cone towards a bottom end of the powder chamber. However, there is the issue that this cone leads to powder packing during the powder flow towards the bottom of the powder chamber, blocking the functioning of the chamber (so called self-blockade). This packing is due to the small size of the powder and the geometry of the (single) cone.

Preferably, the powder chamber according to the invention breaks down the tendency of the powder to be packed during falling down along a direction of gravitation which means from the top end to the bottom end of the powder chamber. This is achieved by the design of the second wall section that is arranged below the first wall section and which has an angle that is smaller than that of the first wall section (hence, the second wall section is more "in parallel" to the vertical than the first wall section). Thus, more space is provided for the powder which prevents or minimizes the packing-effect.

To define the angles, the measuring direction has to be considered. If the measuring direction is directed from the top end to the bottom end, the angles are counted positive and vice versa. Positive angles reach from 0° to <90°, negative angles reach from 0° to >−90°. An angle of +/−90° would mean that the appropriate wall section does no longer "extend" along the axis. Therefore, the angles are smaller/bigger than +/−90°. An angle of +/−0° means that the appropriate wall section is orientated parallel with respect to the axis. Thus, by way of example and to explain the measuring scheme, a first angle may be for example 12°, wherein a second angle is 0° or −14°. "0" is "smaller" than "12". "−14" is "smaller" than "12", just as well.

According to one embodiment the powder chamber comprises a third wall section that forms a third angle with respect to the axis, wherein the third angle is bigger than the second angle and wherein the third wall section is arranged below the second wall section Thus, the third wall section of the powder chamber, respectively, is (again)—like the first wall section—tapered with respect to the axis.

In other words, the first wall section or the "first volume" of the powder chamber is characterized by a cross-section area diminution up to 60%, preferably 75%, with respect to an inlet cross-section area which forms the opening of the powder chamber, wherein the diminution is at least as big as in the case of a cone/funnel-shaped chamber with a wall angle of 20°, maximum 70°.

The second wall section or the "second volume" of the powder chamber has a cross-section area which can increase or diminish, wherein an increase lies within a range up to 50%, preferably up to 30%, and wherein a diminution lies within a range up to 10%, wherein an average cross-section diminution is at least as big as in the case of a cone/funnel-shaped chamber with a wall angle of 20°. The cross-section increase may be arbitrary. However, according to a preferred embodiment, the cross-section area of the second wall section stays basically constant.

The bottom end of the third wall section or the bottom end of the powder chamber ("third volume"), respectively, is characterized by a cross-section diminution up to 7%, preferably up to 5% or even less, compared to the inlet cross-section area (cf to the bottom plate, described hereinafter), wherein an average cross-section diminution is at least as big as in the case of a cone/funnel-shaped chamber with a wall angle of 20°, maximum 70°.

The design of the third wall section leads to a very small volume of the powder chamber at its bottom end. If a venturi tube is located within the powder chamber, the small volume of the powder chamber around the venturi suction system leads to a constant environment of the venturi system during the complete emptying of the powder chamber which enables very constant flow rates.

A further advantage is that, since the bottom volume of the powder chamber, in other words the suction volume or the third volume (formed by the third wall section) is very small, the residual powder left within the powder chamber becomes very low.

It has to be mentioned that the powder chamber cannot only be used with venturi systems that are located in the middle of the powder chamber, as for example known from centro-symetric powder chambers. The powder chamber may be also used for a sided powder chamber where the venturi tube stays at a side of the powder chamber. The principle stays the same.

According to one embodiment, the first wall section may be orientated basically parallel with respect to the axis.

According to a preferred embodiment, the first wall section is inclined towards the axis forming a first angle that is bigger than 0. Thus, the first wall section forms a first cone or pit that is tapered with the respect to the axis. Cones or pits are known from the prior art, as already mentioned. However, along the direction of gravitation, the powder chamber comprises the second wall section, wherein the second wall section forms a second angle with respect to the axis that is smaller than the first angle formed by the first wall section. This avoids packing of the powder and enables a very constant flow rate.

According to another embodiment, the first angle and/or the third angle is at least about 20°, preferably at least about 27°. The second angle is basically 0°. This means, that the second wall section is basically orientated parallel with respect to the axis, forming a kind of pit. Thus, the powder chamber is designed as "double cone", wherein the two cones are connected by the second wall section that is designed as pit. The first cone, formed by the first wall section, is tapered from the top end to the bottom end and has, according to one embodiment, an angulation that is bigger than about 50°, preferably bigger than about 55°. The same applies to the second cone which is formed by the third wall section. The angulation of the second cone helps to reduce the amount of residual powder.

As the powder chamber comprises different wall sections, these different wall sections define different volumes. According to one embodiment, a volume of the powder chamber, limited by the third wall section, is less than 25% of a complete volume of the powder chamber. As already mentioned before, the residual powder left within the powder chamber becomes very small.

According to another embodiment, the powder chamber comprises a bottom plate, which is basically flat, according to a preferred embodiment. The bottom plate avoids blocking/plugging of an air inlet or a nozzle, respectively, which is arranged at the bottom end of the powder chamber. A diameter of the bottom plate lies, according to some embodiments, within a range of about 3 to 25 mm, preferably within a range of about 4 to 20 mm, in particular within a range of about 10 mm. Of course, if the powder chamber is not rotation-symmetric, the aforementioned values are transferable also to a, for example, rectangular or quadratic bottom plate.

According to another embodiment, the air inlet or nozzle extends into the powder chamber, in particular into the volume formed by the third wall section. This design enables a similar effect as the aforementioned bottom plate. A distance which extends between the bottom end of the powder chamber and the nozzle lies preferably within a range of about 1 to 5 mm. According to a specific embodiment, a bottom plate can be combined with an air inlet or nozzle that extends into the powder chamber. Alternatively, the air inlet or nozzle does not extend into the powder chamber, thus the aforementioned distance may be also 0.

According to another embodiment, a length of the second wall section is at least about 5 mm. A ratio between a length of the first wall section and the length of the second wall section lies for example within a range of about 10-0.1, preferably within a range of about 5-0.5.

According to another embodiment, a ratio between the length of the second wall section and a length of the third wall section is less than 1.

In another embodiment, the ratio lies within a range of about 10-0.1, for example within a range of about 5-0.5. This design provides a small third volume, wherein enough space is provided by the second volume to prevent the powder from packing.

According to another embodiment, a ratio between the length of the first wall section and the length of the second wall section is bigger than 1 which enables a high filling volume in combination with the anti-blocking/plugging effect.

Typical design-parameters (in particular lengths and angles of the wall sections) which enable constant flow rate, good flow control and which provide an improved emptying-behavior with no or a low residue of powder within the powder chamber are as follows: length of the first wall section within a range of about 20-50 mm, preferably within a range of about 25 mm; length of the second wall section within a range of about 5-20 mm, preferably within a range of about 10 mm; length of the third wall section within a range of about 10-20 mm, preferably within a range of about 12 mm; first angle within a range of about 20-70°, preferably within a range of about 25-50°, in particular preferred within a range of about 30°; second angle within a range of about −70 to 20°, preferably within a range of about −20 to 5°, in particular preferred within a range of about 0°; third angle within a range of about 20-70°, preferably within a range of about 25-50°, in particular preferred within a range of about 30°.

According to another embodiment a cross section of the powder chamber which extends perpendicular with respect the axis is polygonal, for example rectangular, quadrangular, square, etc. It can also be round, oval, etc. According to a preferred embodiment, the powder chamber is rotation symmetric. Thus, the axis may be understood as center axis. According to one embodiment, the wall sections are straight in a side view (of the powder chamber). Alternatively, they can also be bent or curved or irregular, in particular concave or convex. In this case, the angles are in particular average angles, wherein the angles are determined via the appropriate tangents. Of course, the powder chamber may also comprise straight and curved/bent wall sections. If a wall section is curved or bent, the angle of a wall section is not constant. However, every infinitesimal small "subsection" of the wall section fulfils the angle-requirements. This means that a wall section can be infinitesimal small. As already mentioned, the powder chamber does not have to be rotation symmetric. Thus, from a top view, the powder chamber does not have to be round, in particular circular, but can also be for example polygonal, star-shaped etc. This means that one wall section may form different angles with the center axis. Nevertheless, there is at least one region of the wall section that fulfils the angle-requirements so that blocking of powder can effectively be avoided.

According to another embodiment, the top end of the powder chamber comprises a sealing portion. The sealing portion comprises for example a sealing element formed as a ring, e. g. made of plastic. The sealing portion is adapted to seal the powder chamber with respect to a container. Generally, the powder chamber is designed/adapted to be positioned and arranged within a container that can be arranged at an air-polishing device. Preferably, the top end of the powder chamber is also adapted to arrange and position an insert, wherein the insert comprises, for example, the venturi tube.

According to another embodiment, the bottom end comprises an air inlet. The air inlet is for example designed as an opening that is adapted to arrange a nozzle or that is designed/formed as a nozzle. The nozzle is adapted to bring or conduct the (pressurized) air into the powder chamber.

According to the invention, an air-polishing device comprises a powder chamber according to the invention. Preferably, the air-polishing device comprises a container, wherein the container is adapted to arrange the powder chamber into it. Thus, according to one embodiment, the powder chamber and/or the container can be easily removed from the air-polishing device.

The air polishing device comprises for example a basic device including one or more connection areas. The connection area(s) is/are adapted to arrange and connect the container to the basic device. The basic device is adapted to provide air to the powder chamber and it is adapted to extract the air/powder-mixture out of the powder chamber. According to one embodiment, e.g. a flexible tube is arranged at the basic device. The flexible tube comprises for example a hand sample that includes a nozzle. According to one embodiment, a jet of water can be added to the air/powder-mixture in the basic device or in the nozzle.

According to another embodiment, the powder chamber is adapted to be directly mounted to the basic device. Thus, the powder chamber comprises the features of a container or vice versa.

BRIEF DESCRIPTION OF THE DRAWINGS

Additional advantages and features of the current invention are shown in the following description of preferred embodiments of the current invention, with reference to the attached drawings. Features and characteristics of respective embodiments are explicitly allowed to be combined within the scope of the current invention.

DETAILED DESCRIPTION

Figure 1:
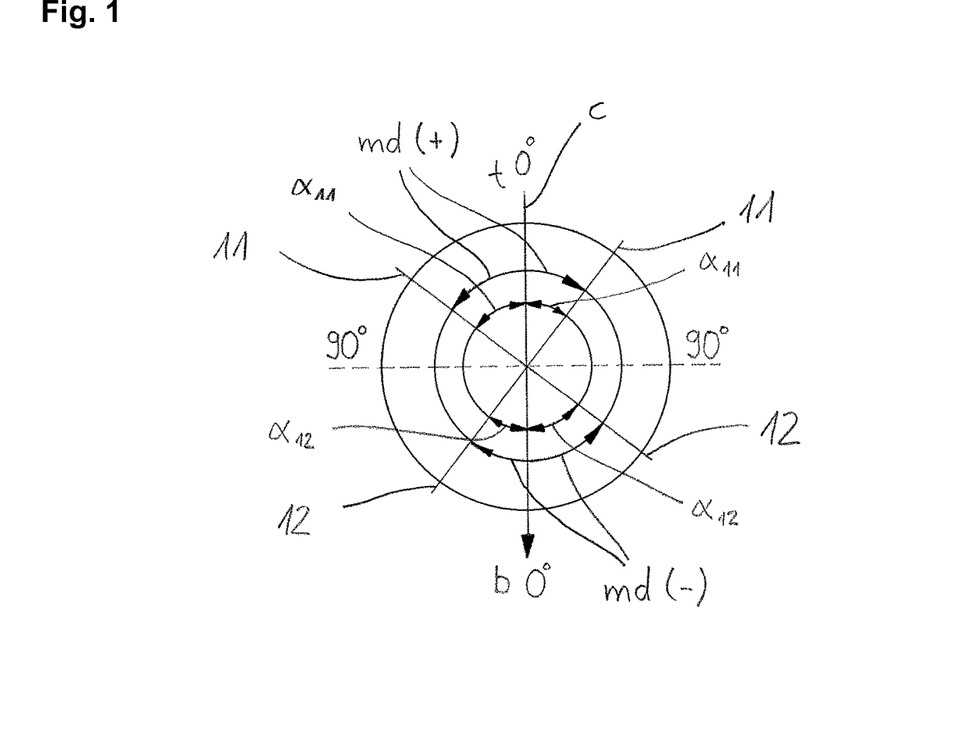
FIG. 1: shows the measuring scheme that is used to define the angles.

FIG. 1 shows the measuring scheme used to define the angles. An axis c is shown that extends from a top end t to a bottom end b of a powder chamber (not shown). A first wall section 11 and a second wall section 12 extend along the axis c. The wall sections are only used by way of example to explain a measuring direction md. First angles $\alpha_{11}$ are measured from the axis c to the wall section 11, so that the acute angle is obtained. The same applies to second angles $\alpha_{12}$ that are formed between the second wall section 12 and the axis c. If the measuring direction is directed from the top end t to the bottom end b, the angles are counted positive. If the measuring direction md is directed from the bottom end b to the top end t, the angles are counted negative. Positive angles reach from 0° to <90°, negative angles reach from 0° to >−90°.

Figure 2:
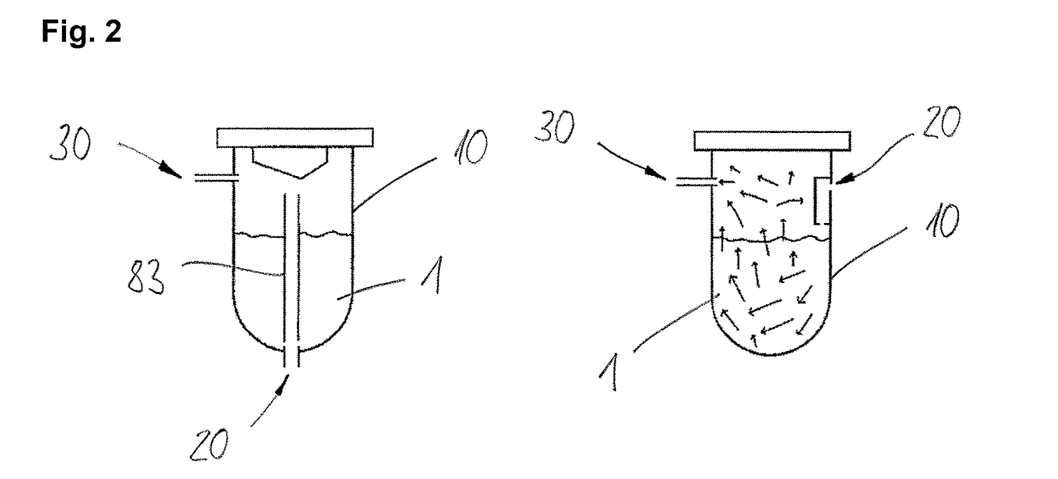
FIG. 2: shows two working principles of air-polishing devices.

FIG. 2 shows two working principles of air-polishing devices, in particular of powder chambers 10. The powder chambers 10 are filled, for example, with powder 1, such as sodium bicarbonate powder, which is steered up by pressurized air. The pressurized air gets into the powder chambers 10 via air inlets 20. An air/powder-mixture is transported via outlets 30, for example through a tube to a nozzle where water is added. In the left design of FIG. 2, air and powder are mixed by combination of carburetor technique and swirling. Therefore, a venturi tube 83 is located within the powder chamber 10. In the other type (shown right) the air/powder-mixture is created by swirling only.

Figure 3:
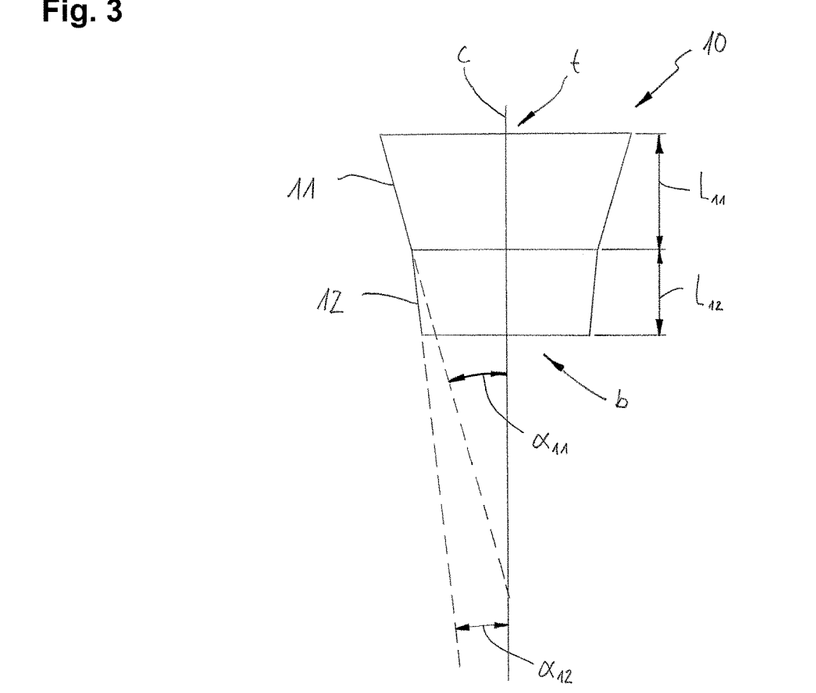
FIG. 3: shows a powder chamber comprising a first and a second wall section.

FIG. 3 shows a powder chamber 10 that extends along an axis c from a top end t to a bottom end b. The powder chamber 10 comprises a first wall section 11 and a second wall section 12. The first wall section 11 forms a first angle $\alpha_{11}$ with the axis c. The second wall section 12 forms a second angle $\alpha_{12}$ with the axis c. The first angle is, according to one embodiment, at least 20°, preferably at least about 27°. The second angle is smaller, as can be seen from FIG. 3. This provides more space for the powder that is located within the powder chamber. Along the axis c, the first wall section 11 has a length $l_{11}$ and the second wall section 12 has a length $l_{12}$ which form appropriate volumes.

Figure 4:
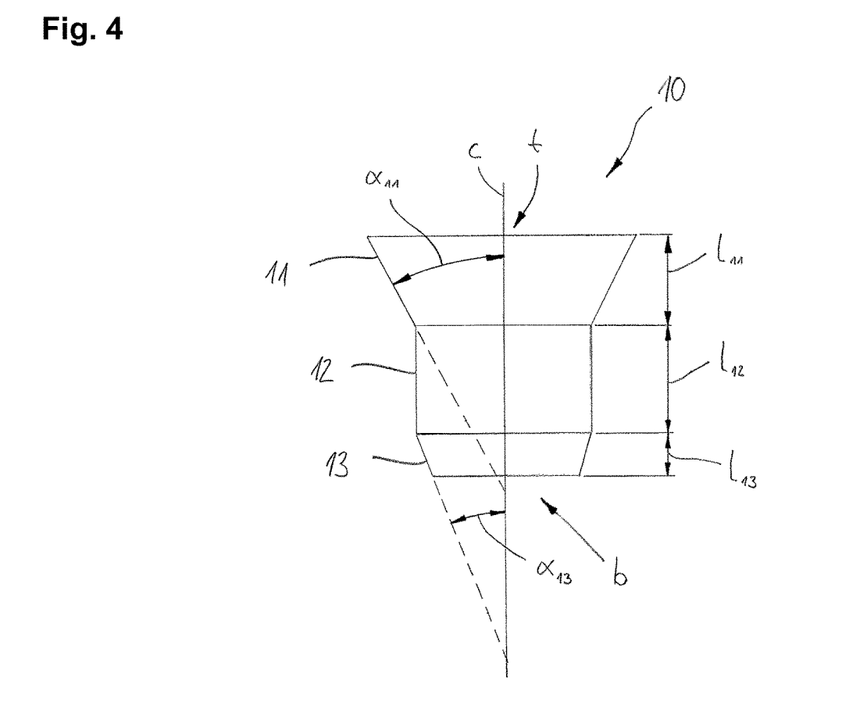
FIG. 4: shows a powder chamber comprising three wall sections.

FIG. 4 shows a powder chamber 10 similarly to that known from FIG. 3. However, the powder chamber 10 comprises also a third wall section 13. A second wall section 12 is basically parallel orientated with respect to an axis c forming a pit. In other words, a second angle $\alpha_{12}$ is basically 0° and thus smaller as a first angle $\alpha_{11}$ of the first wall section 11. A third angle $\alpha_{13}$ of the third wall section 13 is bigger than the second angle $\alpha_{12}$ of the second wall section 12. The wall sections 11, 12 and 13 extend along the axis c from a top end t to a bottom end b and have a length $l_{11}$, $l_{12}$ or $l_{13}$, forming/defining appropriate volumes. FIG. 4 shows a "double cone"-design. The first and the third angles $\alpha_{11}$, $\alpha_{13}$ are at least about 20°, preferably at least about 25° or at least about 27°. This means that an angulation of the cones is at least about 50°, preferably at least about 55°.

Figure 5:
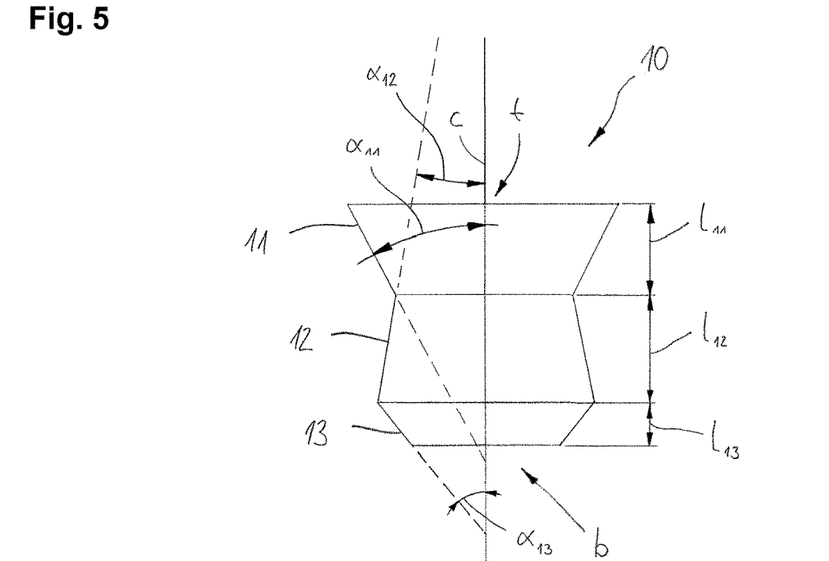
FIG. 5: shows a further embodiment of a powder chamber comprising three wall sections.

FIG. 5 shows a further embodiment of a powder chamber 10 comprising three wall sections 11, 12, 13 extending along an axis c from a top end t to a bottom end b. The first wall section 11 forms a first angle $\alpha_{11}$ with respect to the axis c. The first angle $\alpha_{11}$ is bigger than 0° thus forming a first cone. A second angle $\alpha_{12}$ of the second wall section 12 is smaller than the first angle $\alpha_{11}$. In particular, the second angle $\alpha_{12}$ is negative whereby self-blockade can be prevented very effectively. A third angle $\alpha_{13}$ formed by the third wall section 13 is bigger than the second angle $\alpha_{12}$. Actually, the third angle $\alpha_{13}$ is again positive (forming a second cone), similar to the first angle $\alpha_{11}$ whereby a very small third volume is formed which optimizes the emptying-behavior and which reduces the residual powder left within the powder chamber 10.

Figure 6:
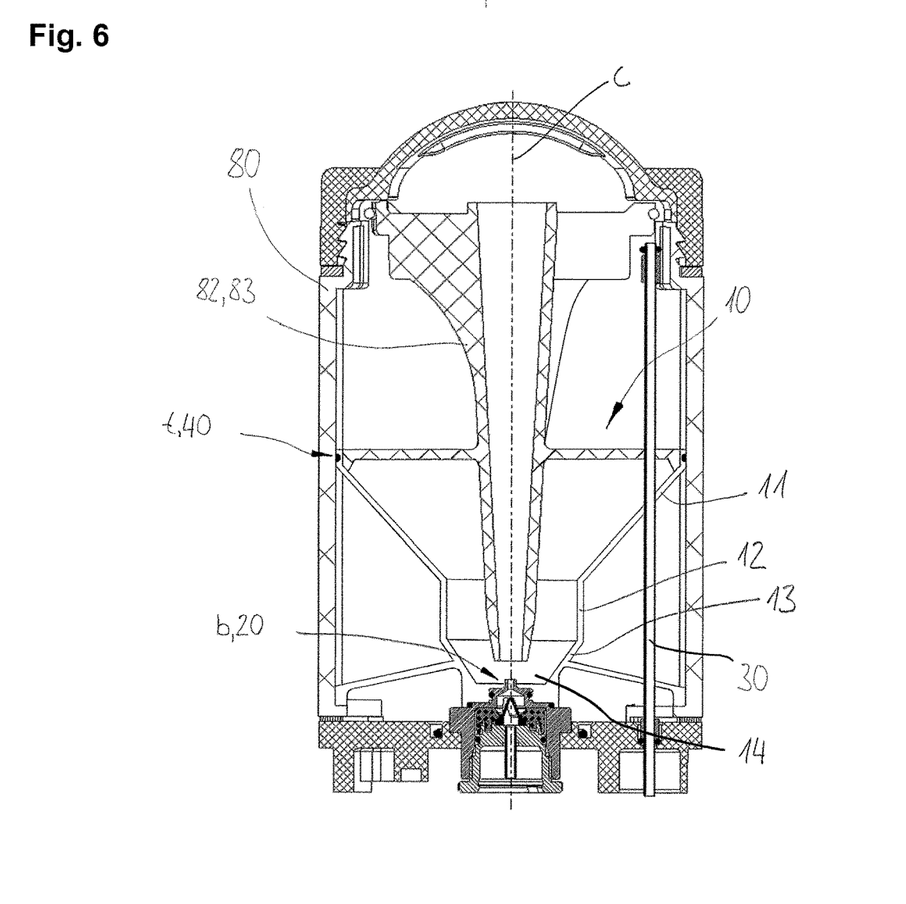
FIG. 6: shows a container comprising a powder chamber with three wall sections.
Figure 7A:
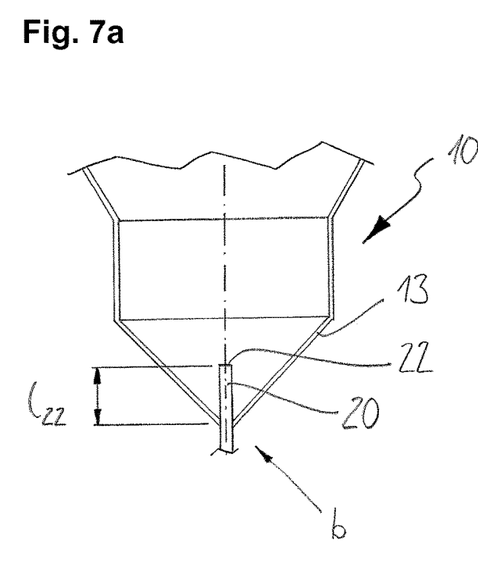
FIG. 7a: shows a powder chamber, in particular a bottom end.
Figure 7B:
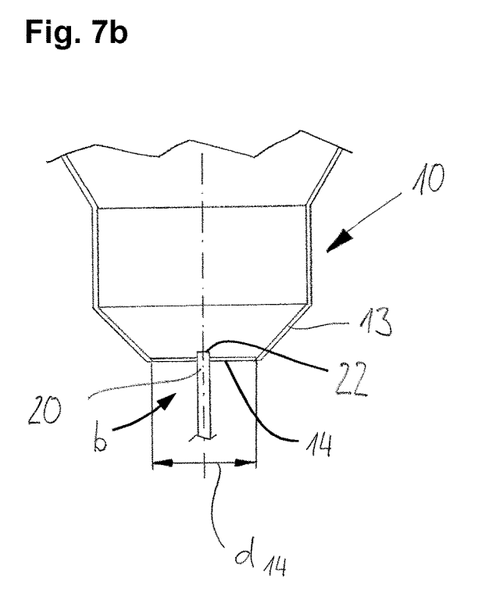
FIG. 7b: shows a powder chamber comprising a bottom plate.

FIG. 6 shows a container 80 as it is used in air-polishing devices. Within the container 80 a powder chamber 10 is arranged. The powder chamber 10 comprises a first wall section 11, a second wall section 12 and a third wall section 13. The powder chamber 10 extends along an axis c from a top end t to a bottom end b. The top end t of the powder chamber 10 comprises a sealing portion 40 which seals in particular the first wall section 11 with respect to the container 80. The bottom end b of the powder chamber 10 comprises an air inlet 20. In the embodiment shown in FIG. 6, the top end t of the powder chamber 10 is adapted to arrange an insert 82. The insert 82 comprises a venturi tube 83. An outlet 30 is adapted to bring/conduct an air/powder-mixture to an air polishing device (not shown). Expediently, the walls of the third wall section 13 do not converge into an apex. Instead, a flat bottom plate 14 is formed which is adapted to avoid blocking of the air inlet 20 due to the powder which is in the powder chamber 10. FIGS. 7a and 7b deal with this aspect in a more detailed way.

FIG. 7a shows a powder chamber 10, in particular a bottom end b and a third wall section 13. An air inlet 20 extends into the powder chamber 10, in particular into the volume formed by the third wall section 13. A distance $l_{22}$ which extends between the bottom end b and a nozzle 22 of the air inlet 20 lies preferably within a range of about 1 to 5 mm. This prevents the air inlet 20 or the nozzle 22, respectively, from plugging/blocking with powder.

FIG. 7b shows a powder chamber 10, similar to the one shown in FIG. 7b. However, at a bottom end b a bottom plate 14 is formed. A diameter $d_{14}$ lies according to some embodiments within a range of about 3 to 25 mm, preferably within a range of about 4 to 20 mm, in particular within a range of about 10 mm. The bottom plate 14 avoids blocking/plugging of the air inlet 20 or the nozzle 22, respectively. As can be seen from FIG. 7b, the nozzle 22 extends also a little bit into the volume formed by a third wall section 13. This increases the effect of the bottom plate 14.

Figure 8:
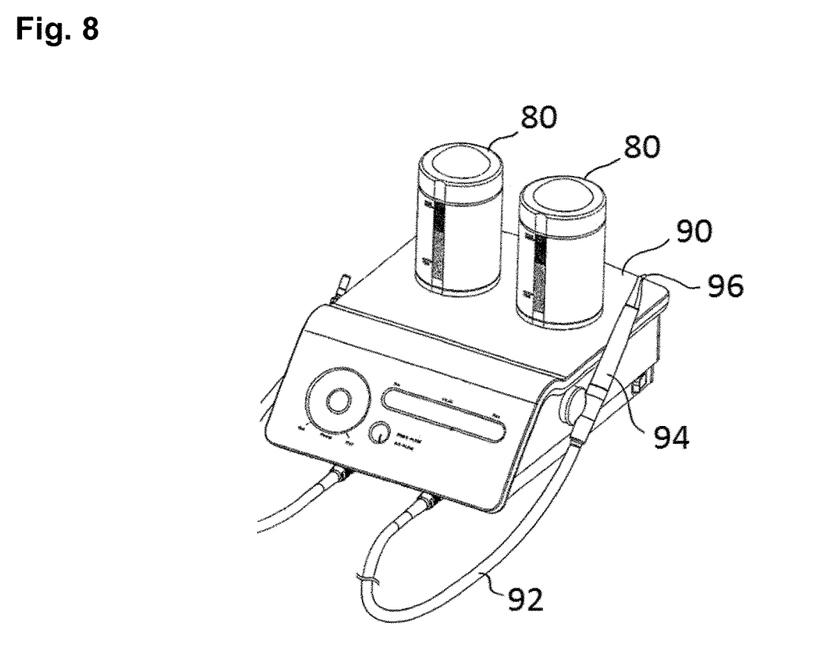
FIG. 8: shows a perspective view of an air-polishing device.

FIG. 8 shows by way of example an air polishing device 90 comprising two containers 80 that are arranged at a basic device of the air polishing device 90. A flexible tube 92 is arranged at the basic device. The flexible tube 92 ends in a hand sample 94 that includes a nozzle 96. Preferably, the container 80 can be easily removed if a (inserted) powder chamber is empty. Alternatively, only the powder chamber that is arranged within the container may be removed to insert a new (full) one.

The invention claimed is:

1. Powder chamber for an air polishing device, extending from a top end to a bottom end along an axis, for breaking down the tendency of the powder to be packed during falling down along a direction of gravitation, said powder chamber comprising:

at least two wall sections, wherein a first wall section forms a first angle with respect to the axis and the first angle is within a range of 20-70°, wherein a second wall section forms a second angle with respect to the axis and the second angle is within a range of −70 to 20°, wherein the angles are measured in a measuring direction from the axis to the appropriate wall section in such a manner so that acute angles are obtained, wherein the second wall section is arranged below the first wall section, wherein the second angle is smaller than the first angle;

wherein the bottom end comprises an air inlet, the air inlet being formed as nozzle to conduct air into the powder chamber, wherein a bottom plate is arranged at the bottom of the powder chamber, wherein the nozzle extends from the bottom plate into the powder chamber;

wherein the air inlet extends into the powder chamber, wherein an outlet is arranged at the top end of the powder chamber to transport the powder gas mixture to the air polishing device, comprising a third wall section that forms a third angle with respect to the axis, wherein the third angle is bigger than the second angle, wherein the third wall section is arranged below the second wall section wherein the first angle and/or the third angle is at least 15°, wherein the outlet being configured to bring an air-powder-mixture to the air polishing device, wherein the outlet is spaced from the inlet, and wherein a Venturi-tube is arranged at a side of the powder chamber and wherein the powder chamber is filled with low abrasive powder, wherein a grain size of the powder is smaller than about 100 μm on average.

2. Powder chamber according to claim 1, wherein the first wall section is inclined towards the axis forming a first angle >0.

3. Powder chamber according to claim 2, wherein a volume of the powder chamber, limited by the third wall section, is less than 25% of a complete volume of the powder chamber.

4. Powder chamber according to claim 1, wherein the second angle is about 0°.

5. Powder chamber according to claim 1, wherein a length of the second wall section is at least about 5 mm.

6. Powder chamber according to claim 5, wherein a ratio between the length of the second wall section and a length of the third wall section is less than 1.

7. Powder chamber according to claim 5, wherein a ratio between a length of the first wall section and the length of the second wall section is bigger than 1.

8. Powder chamber according to claim 1, wherein the powder chamber is rotation symmetric.

9. Powder chamber according to claim 1, wherein the top end comprises a sealing portion.

10. Air polishing device comprising a powder chamber according to claim 1.

* * * * *